US011807358B2

(12) United States Patent
Barnes et al.

(10) Patent No.: US 11,807,358 B2
(45) Date of Patent: Nov. 7, 2023

(54) SUBMERSIBLE DRONE DELIVERY AND RECOVERY SYSTEM USING WATERPROOF AERIAL DRONE

(71) Applicant: Bell Textron Inc., Fort Worth, TX (US)

(72) Inventors: Brian Erik Barnes, Bedford, TX (US); Gary Miller, North Richland Hills, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 372 days.

(21) Appl. No.: 17/074,172

(22) Filed: Oct. 19, 2020

(65) Prior Publication Data

US 2022/0119104 A1    Apr. 21, 2022

(51) Int. Cl.
| | | |
|---|---|---|
| *B64C 29/02* | (2006.01) | |
| *B63B 79/40* | (2020.01) | |
| *B60F 5/02* | (2006.01) | |
| *B63B 43/12* | (2006.01) | |
| *B64U 60/10* | (2023.01) | |
| *B64U 10/20* | (2023.01) | |
| *B63G 8/00* | (2006.01) | |

(52) U.S. Cl.
CPC ............... *B64C 29/02* (2013.01); *B60F 5/02* (2013.01); *B63B 43/12* (2013.01); *B63B 79/40* (2020.01); *B64U 10/20* (2023.01); *B64U 60/10* (2023.01); *B63G 8/001* (2013.01)

(58) Field of Classification Search
CPC ......... B64C 29/02; B64C 25/54; B64C 25/56; B64D 25/18; B63G 8/001; B63G 2008/002; B63G 2008/004; B63G 2008/005
See application file for complete search history.

(56) References Cited

U.S. PATENT DOCUMENTS

| | | | | |
|---|---|---|---|---|
| 3,946,685 A | * | 3/1976 | Chadbourne | B63G 8/22 137/625.46 |
| 7,255,054 B1 | * | 8/2007 | DiGregorio | B63G 8/22 114/333 |
| 11,487,283 B1 | * | 11/2022 | Chasen | B64C 37/00 |
| 11,524,772 B1 | * | 12/2022 | Cecil | B64D 25/00 |
| 2015/0102164 A1 | * | 4/2015 | Delorme | B64C 25/56 244/105 |
| 2016/0031275 A1 | * | 2/2016 | Monroe | B63G 8/001 244/2 |
| 2016/0047354 A1 | * | 2/2016 | Bolin | H02K 7/1823 29/596 |
| 2018/0257772 A1 | * | 9/2018 | Bernhardt | B64C 25/54 |
| 2018/0284575 A1 | * | 10/2018 | Sugaki | G03B 17/08 |

(Continued)

*Primary Examiner* — Richard Green
*Assistant Examiner* — Arfan Y. Sinaki
(74) *Attorney, Agent, or Firm* — Akona IP

(57) ABSTRACT

A submersion system for a rotorcraft is described and includes a control module for controlling a depth to which the rotorcraft is submerged in a body of water; a compressed air chamber associated with the control module; and at least one flotation pod including a sealable opening on a top surface thereof and an opening on a bottom surface thereof. The control module selectively causes water to be taken into the at least one flotation pod to cause the submersion system to submerge in the body of water and selectively causes water to be evacuated from the at least one flotation pod to cause the submersion system to float in the body of water.

12 Claims, 10 Drawing Sheets

(56) References Cited

U.S. PATENT DOCUMENTS

| | | | |
|---|---|---|---|
| 2019/0016448 A1* | 1/2019 | Robertson | B64D 27/24 |
| 2020/0010193 A1* | 1/2020 | Alexander | B63G 8/001 |
| 2021/0261248 A1* | 8/2021 | Clark | B64C 39/024 |
| 2021/0307305 A1* | 10/2021 | Fu | B64C 37/00 |

* cited by examiner

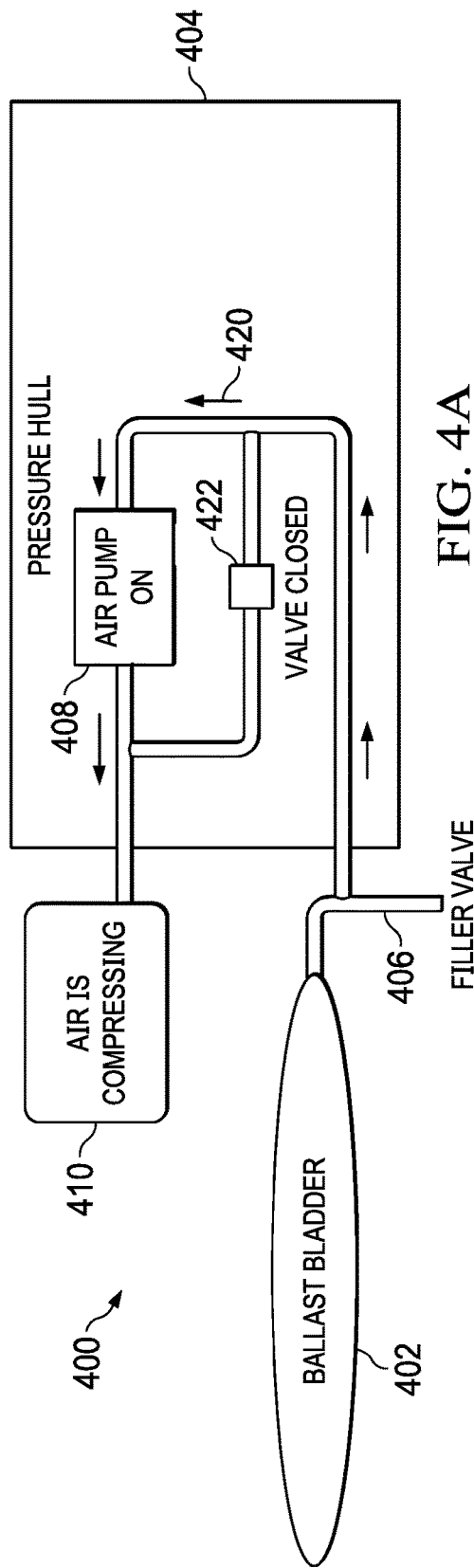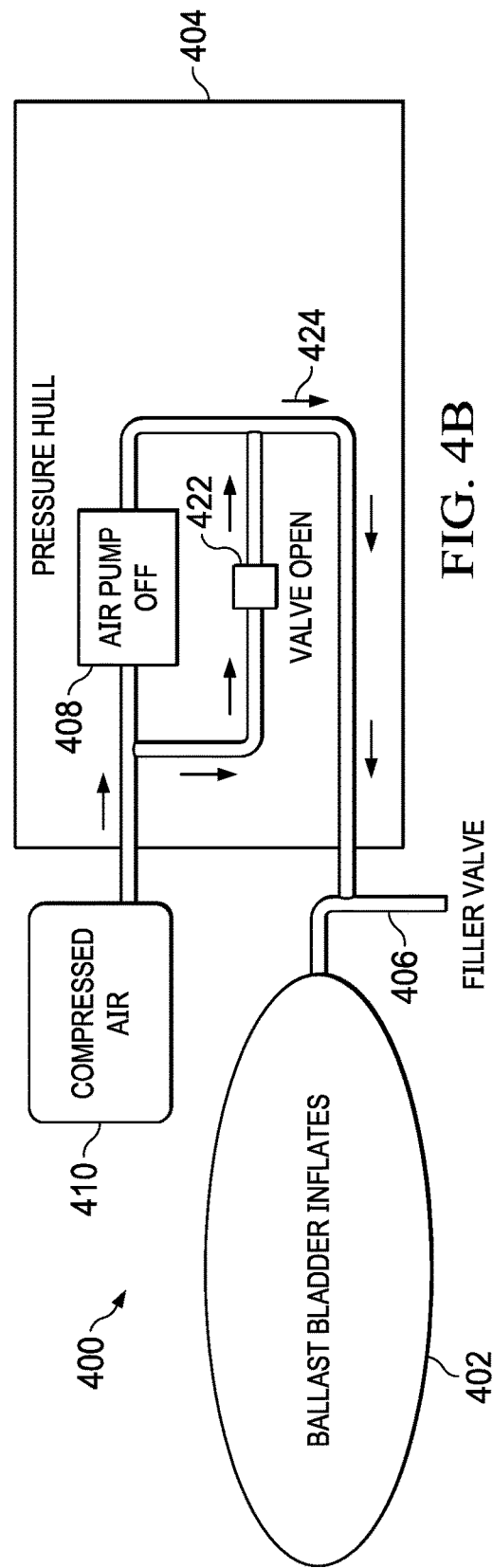

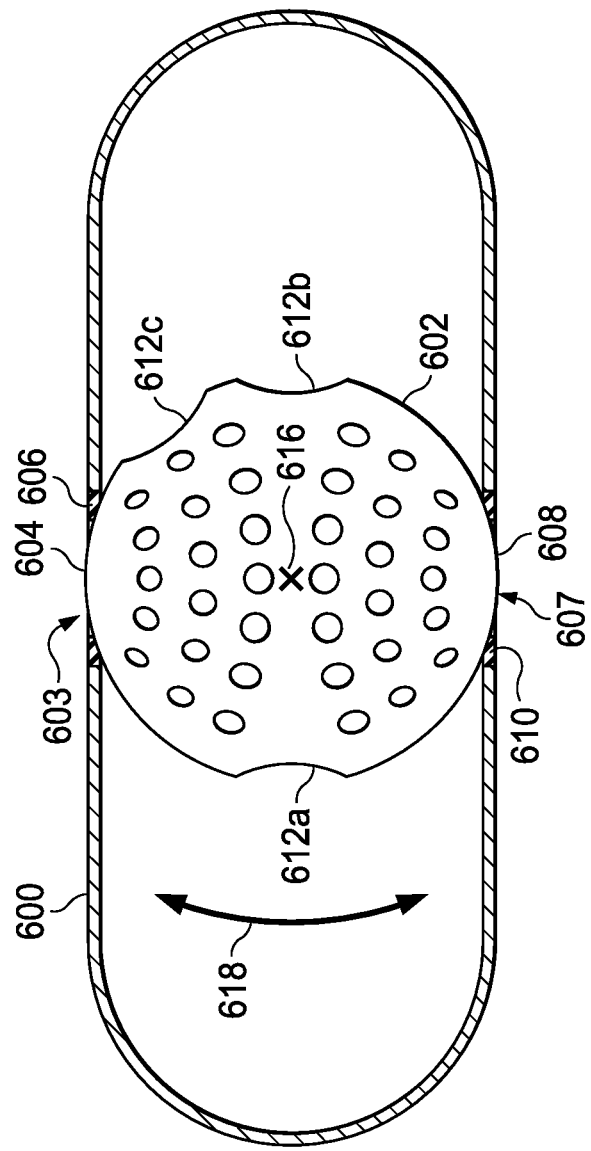

SUBMERSIBLE DRONE DELIVERY AND RECOVERY SYSTEM USING WATERPROOF AERIAL DRONE

TECHNICAL FIELD

This disclosure relates in general to the field of submersible aerial drones and, more particularly, though not exclusively, to submersible aerial drone delivery and recovery systems using waterproof aerial drones.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based, or remote, controller, and a system of communication between the vehicle and controller.

SUMMARY

One embodiment is a submersion system for a rotorcraft that includes a control module for controlling a depth to which the rotorcraft is submerged in a body of water; a compressed air chamber associated with the control module; and at least one flotation pod including a sealable opening on a top surface thereof and an opening on a bottom surface thereof. The control module may selectively cause water to be taken into the at least one flotation pod to cause the submersion system to submerge in the body of water and selectively cause water to be evacuated from the at least one flotation pod to cause the submersion system to float in the body of water.

Another embodiment is an aerial delivery and recovery system comprising a tail sitter aircraft for transporting an unmanned submersible exploration device; and a submersion system connected to the tail sitter aircraft. The submersion system may include a control module for controlling a depth to which the tail sitter aircraft is submerged in a body of water; a compressed air chamber associated with the control module; and at least one flotation pod connected to the rotorcraft, the flotation pod including a sealable opening on a top surface thereof and an opening on a bottom surface thereof. The control module may selectively cause water to be taken into the at least one flotation pod to cause the submersion system to submerge in the body of water and selectively cause water to be evacuated from the at least one flotation pod to cause the submersion system to float in the body of water. The control module may further selectively cause pressurized air from the compressed air chamber to be injected into the at least one flotation pod.

Yet another embodiment is a method of operating an aerial delivery and recovery system (ADRS) comprising a waterproof unmanned aerial vehicle (UAV) for transporting an unmanned submersible exploration device a submersion system connected to the UAV for controlling a depth to which the UAV is submerged in a body of water. The method may include landing the ADRS on a surface of the body of water; submerging the ADRS to a selected depth beneath the surface of the body of water; and subsequent to the submerging, launching the unmanned submersible exploration device from the UAV into the body of water.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements:

FIGS. 4A and 4B are schematic diagrams illustrating operation of the submersion system of FIG. 3 in accordance with embodiments described herein;

FIG. 6 is a schematic diagram of a control valve for use in connection with the submersion system of FIG. 3 in accordance with embodiments described herein;

DETAILED DESCRIPTION

Figure 1:
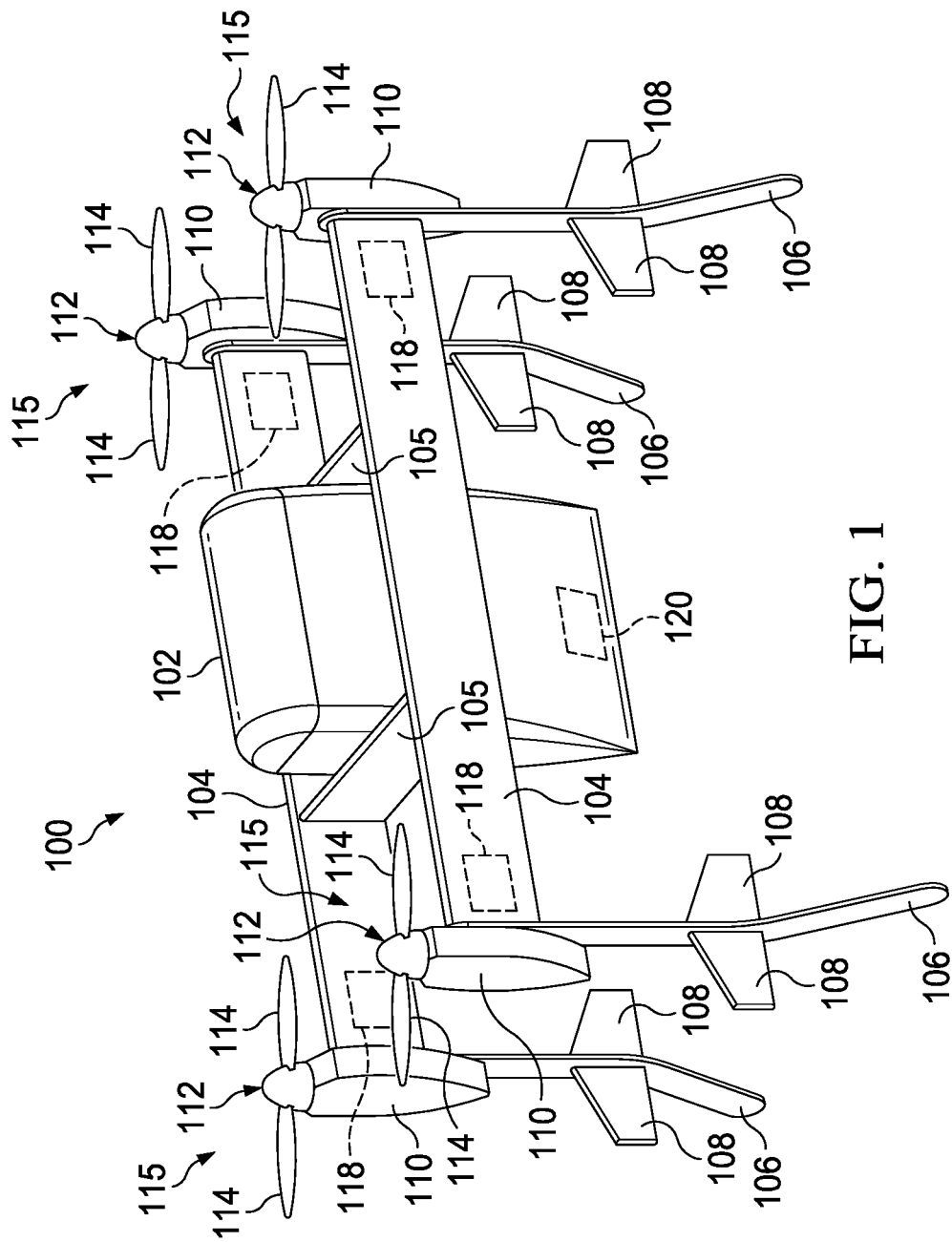
FIGS. 1 and 2 are simplified diagrams of an example UAV, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 2:
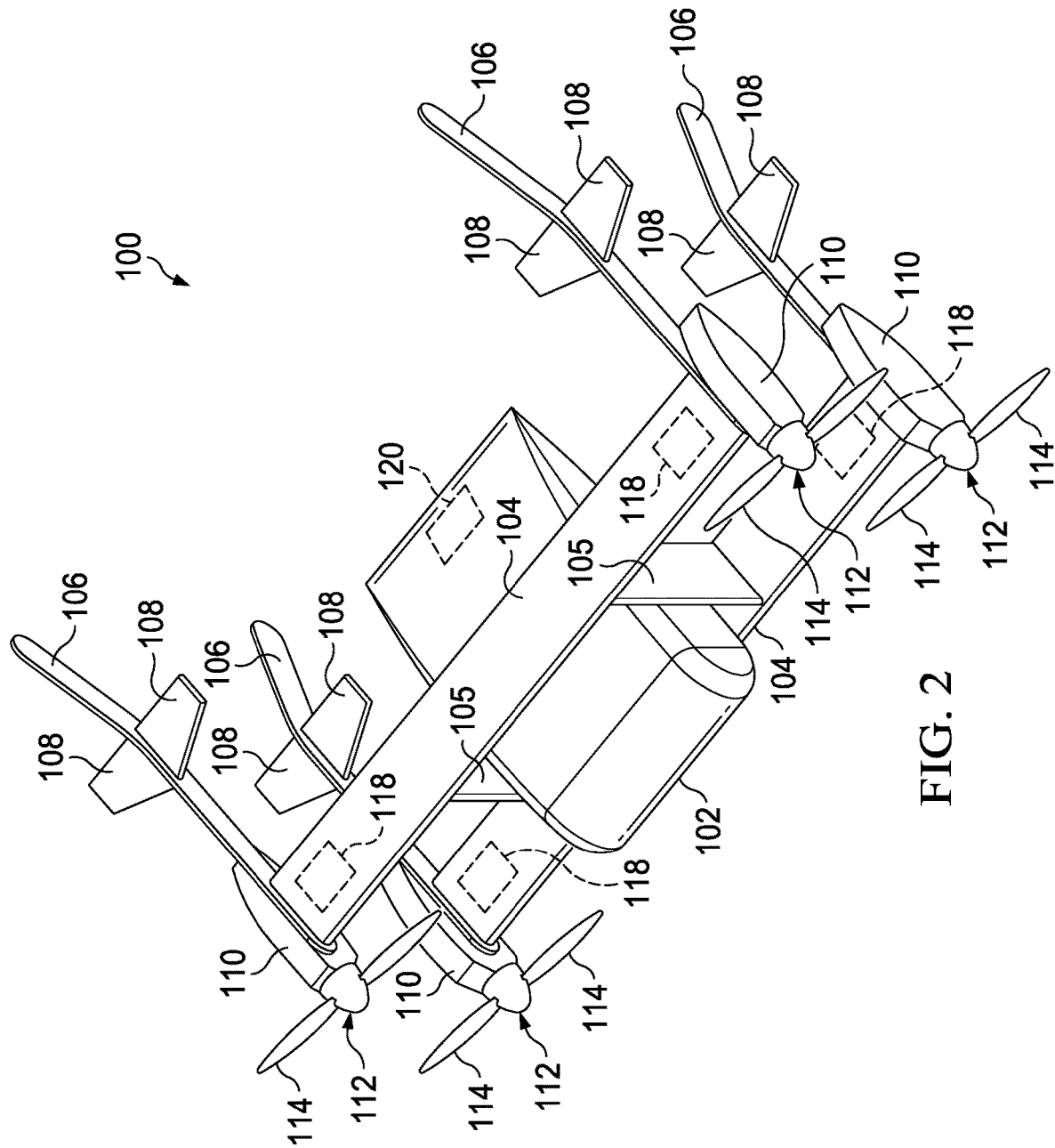

Referring now to FIGS. 1 and 2, illustrated therein is an example embodiment of an aircraft 100, which in the illustrated examples is generally configured as a vertical takeoff and landing ("VTOL") aircraft. More specifically, aircraft 100 may be an autonomous pod transport ("APT") convertible drone-type aircraft (discussed in further detail below) that is operable in different flight modes including a helicopter mode (as shown in FIG. 1) and an airplane mode (as shown in FIG. 2). In helicopter mode, aircraft 100 may be capable of various flight maneuvers including, but not limited to, vertical takeoff from and landing to one or more landing zone(s), hover, and/or sideward and rearward mobility or flight. In airplane mode, aircraft 100 may be capable of forward flight maneuvers. Additionally, since aircraft 100 is a convertible aircraft, it is also operable in a conversion, or transition, mode when transitioning between the helicopter and airplane modes.

As previously noted, unlike fixed-wing aircraft, VTOL aircraft do not require runways. Instead, VTOL aircraft are capable of taking off, hovering, and landing vertically. As also noted above, helicopters and tiltrotors are examples of VTOL aircraft. Yet another type of VTOL aircraft is commonly referred to as a "tail-sitter" aircraft. As the name implies, a tail-sitter aircraft takes off and lands on its tail, but tilts horizontally for forward flight. As illustrated in the embodiments of FIGS. 1 and 2, aircraft 100 is configured as a tail-sitter aircraft. Being a drone-type aircraft, aircraft 100 is configured for remote control and operation. Additionally, at least in some embodiments, aircraft 100 may be fully autonomous and self-directed via a predetermined or pre-programmed location-based guidance system (e.g., global positioning system ("GPS"), coordinate-based location, street address, etc.). Additionally, aircraft 100 may be a manned aircraft.

In at least one embodiment, aircraft 100 may include a cargo pod 102 that functions as the fuselage, wings 104, vertical supports 105 disposed between the wings 104, tail booms 106, horizontal stabilizers 108 extending from each tail boom 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 may also include plurality of aircraft sensors 118 and a control system 120. Wings 104 comprise a substantially parallel, double-wing (sometimes referred to as "biplane") configuration that provides lift to the aircraft 100 during forward flight (e.g., as shown in FIG. 2) while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 are curved at the aft ends to provide stabilization to the aircraft 100 during forward flight in a manner substantially similar as other tail surfaces known in the art, while also doubling as a landing gear for the aircraft 100. As such the curved ends of the tail booms 106 may provide a wider base for landing gear uses. Each tail boom 106 also comprises a pair of horizontal stabilizers 108 coupled to each of an inner and outer surface of the tail boom 106. The horizontal stabilizers 108 function to provide stabilization to the aircraft 100 during forward flight in a manner substantially similar as horizontal stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor (not shown) within each pylon 110. However, in other embodiments, the rotor systems 112 may be driven by a combustion engines or auxiliary power unit through a plurality of interconnect driveshafts and/or auxiliary gearboxes, which may be housed within any portion of an aircraft (e.g., within a pylon, fuselage, combinations thereof, or the like). Furthermore, since aircraft 100 functions as a convertible aircraft, the rotational speeds of each rotor system 112 may be selectively controlled to orient aircraft 100 in the various flight modes.

In various embodiments, control system 120 may include one or more processor(s), memory element(s), network connectivity device(s), storage, input/output (I/O) device(s), combinations thereof, or the like to facilitate operations of each propulsion assembly 115 and/or other electronic systems of aircraft 100. In various embodiments, operation of each propulsion assembly 115 may include controlling the rotational speed of rotor systems 112, adjusting thrust vectors of rotor systems 112, and the like to facilitate vertical lift operations, forward thrust operations, transition operations, combinations thereof, or the like for aircraft 100. In some embodiments, feedback may be received by control system 120 (e.g., via each propulsion assembly 115, one or more sensors 118, etc.) to facilitate or augment various operations of aircraft 100. In various embodiments, sensors 118 may include, but not be limited to, positioning sensors, attitude sensors, speed sensors, environmental sensors, fuel sensors, temperature sensors, location sensors, combinations thereof, or the like.

When aircraft 100 is in a helicopter mode position, rotor systems 112 may provide a vertical lifting thrust for aircraft 100, which may enable hover flight operations to be performed by aircraft 100. When aircraft 100 is in an airplane mode position, rotor systems 112 may provide a forward thrust and a lifting force may be supplied by wings 104.

Figure 3:
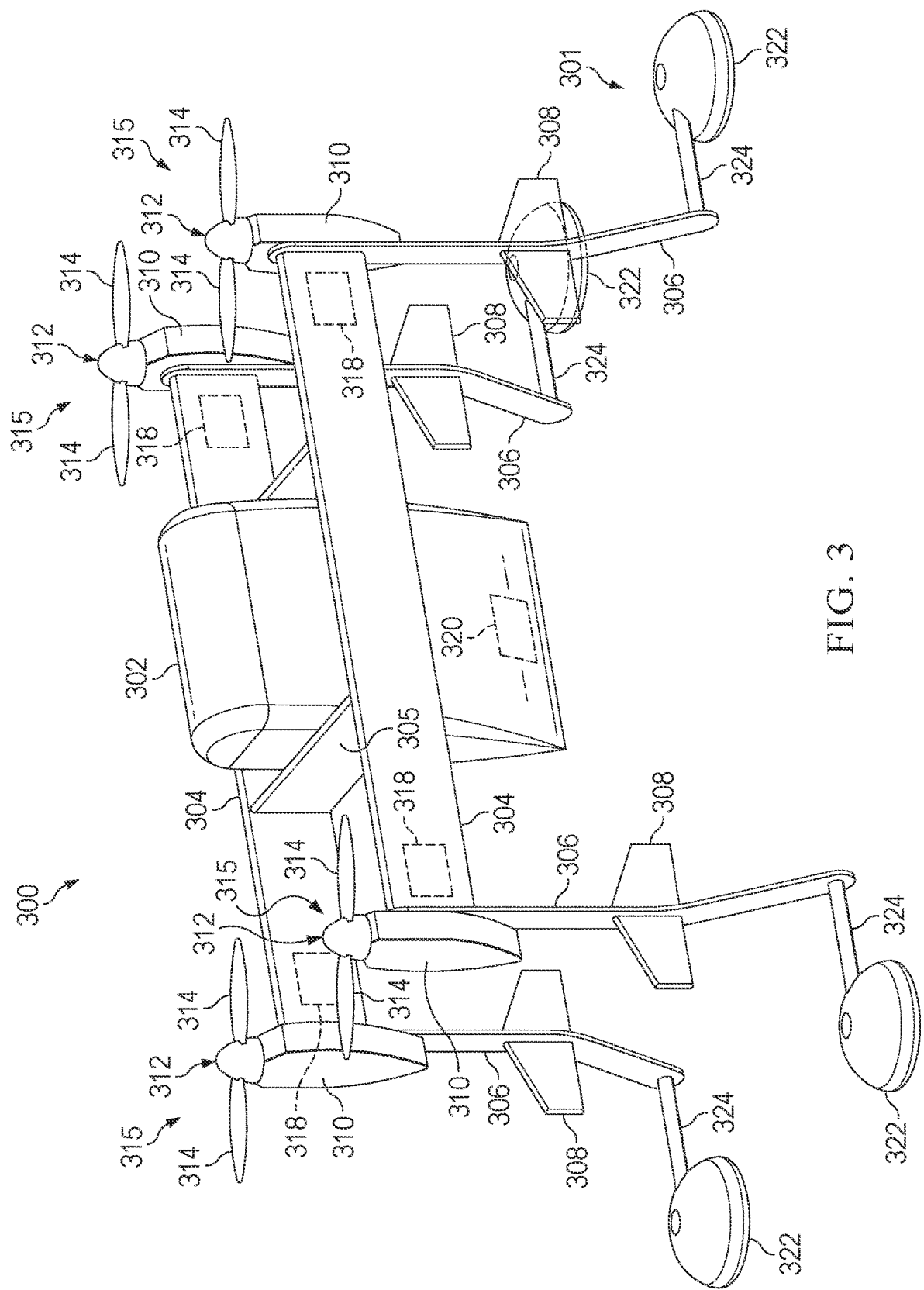
FIG. 3 is a perspective view of a waterproof aerial drone including a submersion system in accordance with embodiments described herein.

Referring now to FIG. 3, illustrated therein is a waterproof aerial drone 300 including a submersion system 301. In accordance with features of embodiments described herein, once the drone 300 has flown to and landed on the surface of a body of water, the submersion system 301 enables the drone to selectively float on the surface of the water, partly or completely submerge below the surface, and then resurface. As illustrated in FIG. 3, the drone 300 is implemented as an APT convertible drone-type aircraft and may be similar in all relevant respects to the aircraft 100 (FIGS. 1 and 2). As such, drone 300 is operable in different flight modes including helicopter mode, in which it may be capable of various flight maneuvers including, but not limited to, vertical takeoff from and landing to one or more landing zone(s), hover, and/or sideward and rearward mobility or flight, and airplane mode, in which it may be capable of forward flight maneuvers. As with aircraft 100, since drone 300 is a convertible aircraft, it is also operable in a conversion, or transition, mode when transitioning between the helicopter and airplane modes.

As illustrated in FIG. 3, drone 300 is configured as a tail-sitter aircraft and, as a drone-type aircraft, is configured for remote control and operation. In at least in some embodiments, drone 300 may be fully autonomous and self-directed via a predetermined or preprogrammed location-based guidance system (e.g., global positioning system ("GPS"), coordinate-based location, street address, etc.). Additionally, drone 300 may be a manned aircraft.

In at least one embodiment, drone 300 may include a cargo pod 302 that functions as the fuselage and, as will be described in greater detail below, may house a submersible drone (not shown in FIG. 3) transported by drone 300. Drone 300 may further include wings 304, vertical supports 305 disposed between the wings 304, tail booms 306, optional horizontal stabilizers 308 extending from each tail boom 306, and a plurality of pylons 310 each comprising a rotor system 312 having a plurality of rotor blades 314. Each combination of a pylon 310 and its associated rotor system 312 comprising rotor blades 314 may be referred to herein as a propulsion assembly 315. Drone 300 may also include plurality of aircraft sensors 318 and a control system 320.

The cargo pod 302 is generally positioned between the wings 304 and the vertical supports 305. In the embodiment shown, the cargo pod 302 is affixed to the vertical supports 305. However, in other embodiments, the cargo pod 302 may be affixed to the wings 304 or both the wings 304 and vertical supports 305. Additionally, while two vertical supports 305 are shown, in some embodiments, drone 300 may comprise more vertical supports 305 depending on the configuration of the drone 300.

In various embodiments, control system 320 may include one or more processor(s), memory element(s), network connectivity device(s), storage, input/output (I/O) device(s), combinations thereof, or the like to facilitate operations of each propulsion assembly 315 and/or other electronic systems of drone 300 in the same manner as control system 120 functions with respect to aircraft 100.

As will be described in greater detail below, in certain embodiments, the submersion system 301 includes a control module, a super-dried compressed gas (i.e., air) chamber, water level sensors, and one or more flotation compartments, or "pods," 322, which may be connected to distal ends of each of tail booms 306 via attachment mechanisms 324. In operation, as will be described in detail below, a variety of ballast control and other systems may be used for causing the submersion system 301 to float, submerge to a desired depth (as indicated by depth sensors associated with the submersion system 301), adjust attitude/trim underwater, and resurface as desired. It will be recognized that, although the submersion system 301 is illustrated as including four submersion pods, the submersion system may include more or fewer submersion pods as may be appropriate for a particular application. In certain embodiment, the body or fuselage of the aircraft itself may be airtight and fitted with valves and/or drains and thereby function as a submersion pod.

FIGS. 4A and 4B illustrate an example of a recirculating compressed air ballast control system 400, which is a closed system solution that allows operation without generating bubbles (functionally similar to a scuba rebreather without oxygen replenishment) and minimal gas charging or replacement. As illustrated in FIGS. 4A and 4B, the system 400 includes a ballast bladder 402 connected to a pressure hull 404 via a filler valve 406. When the system 400 is placed in a liquid environment, the pressure hull 404 operates to deflate the ballast bladder 402 (FIG. 4A) for a diving, or submerging, operation, and to inflate the ballast bladder 402 for a resurfacing or floating operation (FIG. 4B). In particular, as shown in FIG. 4A, the pressure hull 404 includes an air pump 408 for pumping air from the ballast bladder 402 into a compressed air chamber 410 via a path 420 for causing the system 400 to sink. As shown in FIG. 4B, turning off the air pump 408 and opening a valve 422 allows air to flow from the compressed air chamber 410 into the ballast bladder 402 along a path 424, causing the system 400 to float. This system option can be used in lieu of a traditional ballast control system by incorporating bladders inside of flotation compartments.

Figure 5:
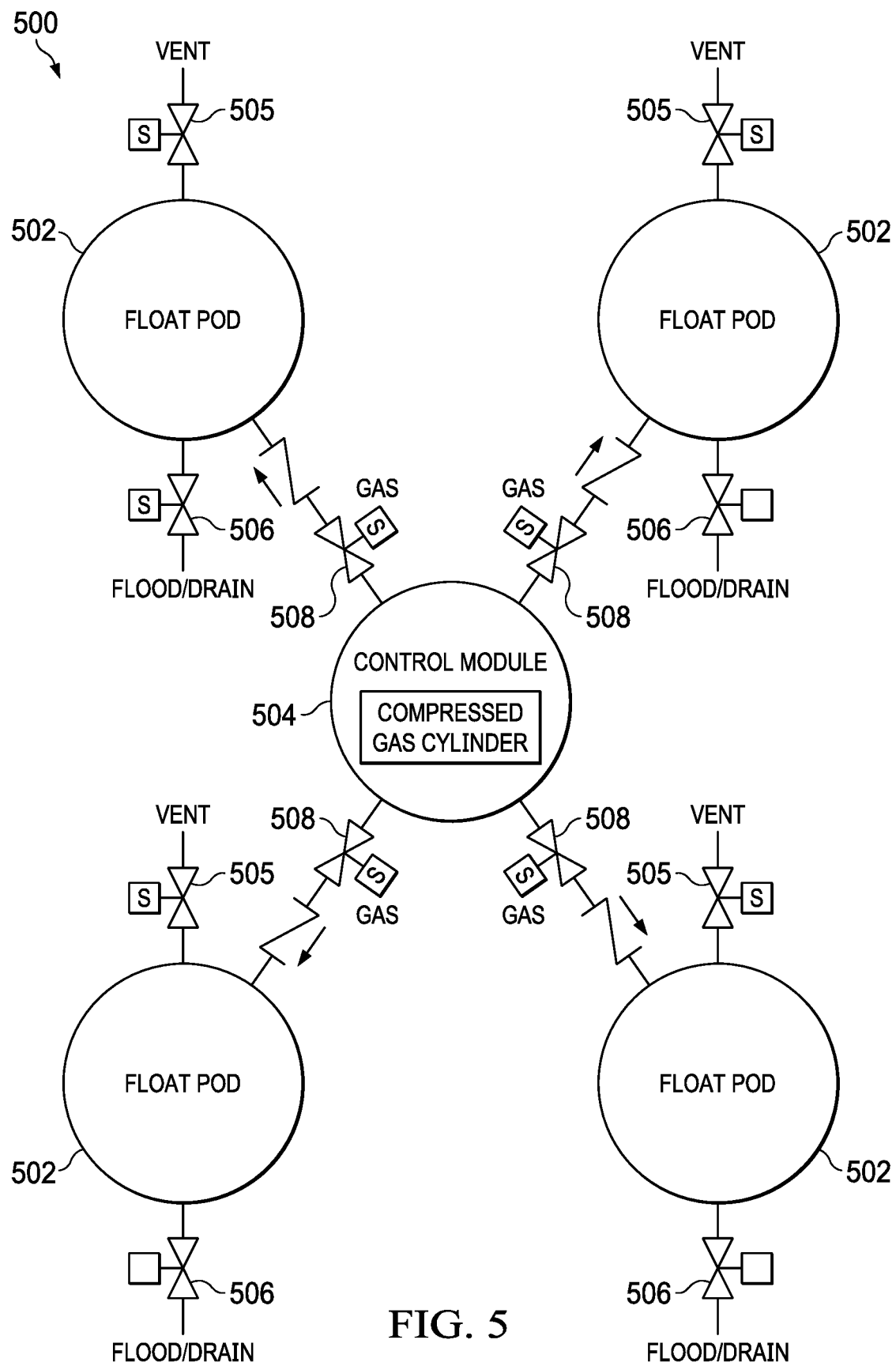
FIG. 5 is a schematic diagram of the submersion system of FIG. 3 in accordance with embodiments described herein.

Referring to FIG. 5, in accordance with features of embodiments described herein, a submersion system 500, which may be used to implement submersion system 301, may be implemented using the concepts of the ballast control system 400. As shown in FIG. 5, the submersion system 500 includes one or more flotation pods 502 connected to a control module 504. Flotation pods may be constructed of a variety of materials based on scale. For example, pods may be manufactured from composite materials (e.g., fiberglass), plastics (e.g., vinyl, nylon), or metal (e.g., aluminum), for example, and may be formed, molded, 3D printed, injection molded, hydroformed, etc. In an example embodiment, the control module 504 controls operation of a compressed gas cylinder and a pump and valve system for pumping air into the cylinder and allowing air to be expelled from the cylinder as illustrated in FIGS. 4A and 4B.

Control module 504 may include non-transitory computer readable storage media including a set of computer instructions executable by one or more processors for controlling the operation of the submersion system 500 as described herein. Control module 504 may be implemented on one or more application specific integrated circuit (ASIC) or other circuits or machines with memory and processing capability. For example, control module 504 may include one or more memory storage modules including, but is not limited to, internal storage memory such as random-access memory, non-volatile memory such as read only memory, removable memory such as magnetic storage memory, optical storage, solid-state storage memory or other suitable memory storage entity. Control module 504 may be a microprocessor-based system operable to execute program code in the form of machine-executable instructions. In addition, control module 504 may be selectively connectable to other computer systems via a proprietary encrypted network, a public encrypted network, the Internet or other suitable communication network that may include both wired and wireless connections.

Each of the flotation pods 502 may include an airtight vent valve or seal 505 on a top surface thereof and a flood and/or drain valve 506 on a bottom surface thereof or may have a bladder inside for a closed system option. Each of the flotation pods 502 may be connected to the control module 504 via a control valve 508 for selectively permitting and inhibiting passage of air between the control module and the flotation pods.

In operation, flotation of the submersion system 500 on the surface of the water (or maintaining the submersion system 500 at a particular depth below the surface of the water) is enabled by closing both the vent valves 505 and the drain valves 506 of each of the flotation pods 502 to seal the pods and thereby maintain the water-to-air ratio at a status quo. Submersion of the submersion system 500 below the surface of the water is enabled by opening the vent valves 505 on each of the flotation pods 502 to allow air to escape from the respective pod and opening the drain/flood valves 506 of each of the flotation pods 502 to allow water to flow into the respective pod, thereby flooding the pods with water and allowing negative buoyancy to sink the flotation system 500 (and the waterproof aerial drone attached thereto). Resurfacing of the submersion system 500 (and the waterproof aerial drone attached thereto) is enabled by closing the vent valve 505 and opening the drain/flood valve 506 of each of the flotation pods 502 and opening each of the control valves 508 to enable the control module 504 to inject compressed air into the flotation pods 502, thereby pressurizing and forcing water out of the pods, increasing their buoyancy and causing the submersion system 500 to rise to the surface of the water.

It will be recognized that other embodiments, the combination of the vent valve or seal 505 and flood and/or drain valve 506 of the flotation pods 502 may be replaced with other mechanisms for enabling the flotation pods (and hence the submersion system 500) to float/submerge. For example, each of the flotation pods 502 may include an airtight vent valve on the top thereof and an open bottom. Alternatively, as will be described in greater detail below, each of the flotation pods 502 may include a single multipurpose three-way valve with an airtight top seal or valves and ports to allow for selectively flooding (sinking) and evacuating (floating) the flotation pod. In each case, compressed air may be injected into the pods to force water out of the pods (e.g., via the open bottom or bottom port) and cause the pods, and the submersion system, to float to the surface of water.

Ballast control may be accomplished using a modular approach to the system, with each flotation pod including an independently operated compressed gas cylinder, flood, and vent system. Alternatively, as illustrated in FIG. 5, a single master compressed gas chamber (i.e., control module 504) could be ported to each of the pods, with each of the pods having individually controlled valves for ballast control. In certain embodiments, a smaller backup cylinder (with or without an inflatable bladder) may be included for emergency backup. Ballast control may also be accomplished using small pumps for transferring water between multiple pods for underwater attitude control. Similarly, in certain embodiments, the control module 504 and/or the flotation pods 502 may include depth sensors for use in controlling how deep the submersion device 500 descends beneath the surface of water.

In operation, the control module 504 controls the depth to which the submersion device 500 (and waterproof aerial drone with which the submersion device 500 may be associated (not shown in FIG. 5) by controlling the opening and closing of vents and drains and controlling injection of compressed air into/evacuation of compressed air from the flotation pods (individually or collectively) to selectively cause water to be flooded into or evacuated from the flotation pods to cause the submersion device to submerge or resurface to a desired level as indicated by the depth sensors.

Referring now to FIG. 6, illustrated therein is a cross-section of an example flotation chamber 600, which may be used for implementing flotation pods, such as pods 322 (FIG. 3), 502 (FIG. 5) in a submersion system for a waterproof aerial drone, such as the submersion systems 301 (FIG. 3), 500 (FIG. 5). The flotation chamber 600 includes a single multipurpose three-way valve 602 to allow for selectively flooding (sinking) and evacuating (floating) the flotation pod. As shown in FIG. 6, the multipurpose three-way valve 602 is implemented as a hollow ball, although other configurations (such as a hollow cylinder) may be implemented. The flotation chamber 600 includes a top vent 603 comprising an opening 604 surrounded by an airtight seal 606 and a bottom drain 607 comprising an opening 608 surrounded by an airtight seal 610. In accordance with features of embodiments described herein the valve 602 includes three holes, or ports, 612*a*, 612*b*, 612*c*, disposed on an outer periphery thereof and is rotatable about an axis 616, as represented by an arrow 618 such that one or more of the ports 612*a*-612*c* may be aligned with the vent 603 and/or drain 607, as illustrated in and described with reference to FIGS. 7A-7D below.

Figure 7A:
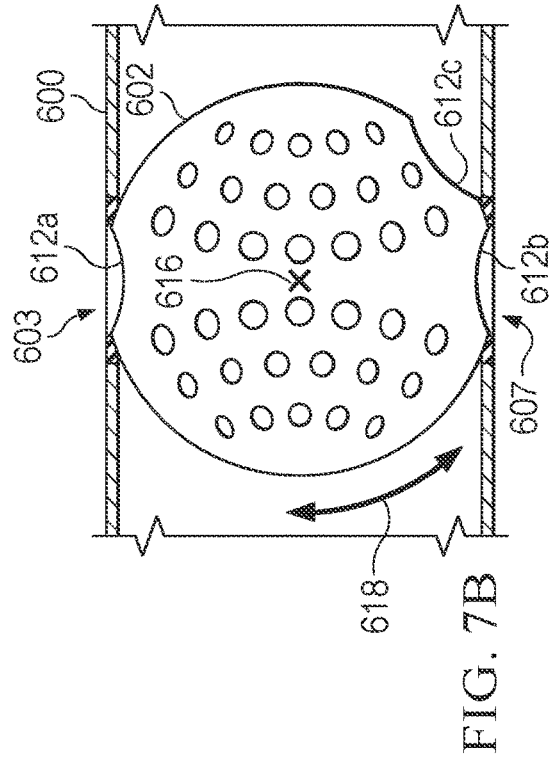
FIGS. 7A-7D are schematic diagrams illustrating operation of the control valve of FIG. 6 in accordance with embodiments described herein.

Referring now to FIG. 7A, the valve 602 is positioned such that none of the ports 612*a*-612*c* are aligned with the vent 603 or the drain 607. As a result, water can neither enter into nor be expelled from the flotation pod 600 through either of the openings 604, 608, which are sealed closed by the seals 606, 610, in contact with the outer surface of the valve 602. FIG. 7A therefore corresponds to a sealed condition of the flotation pod 600 in which the pod maintains its present depth beneath the surface of the water.

Figure 7D:
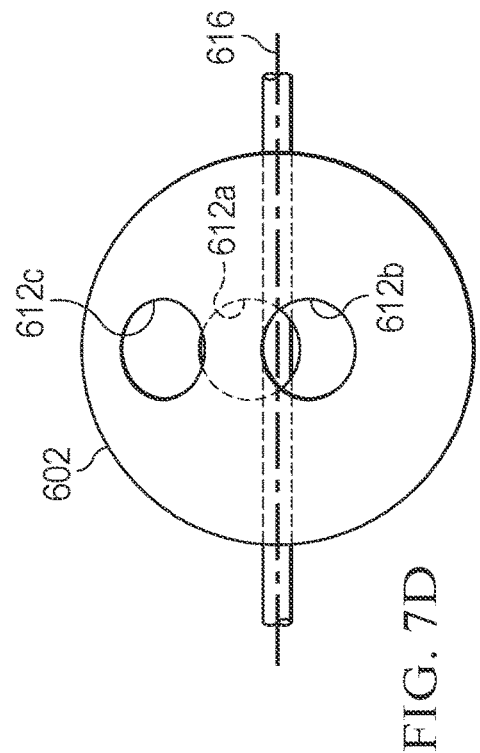
Figure 7B:
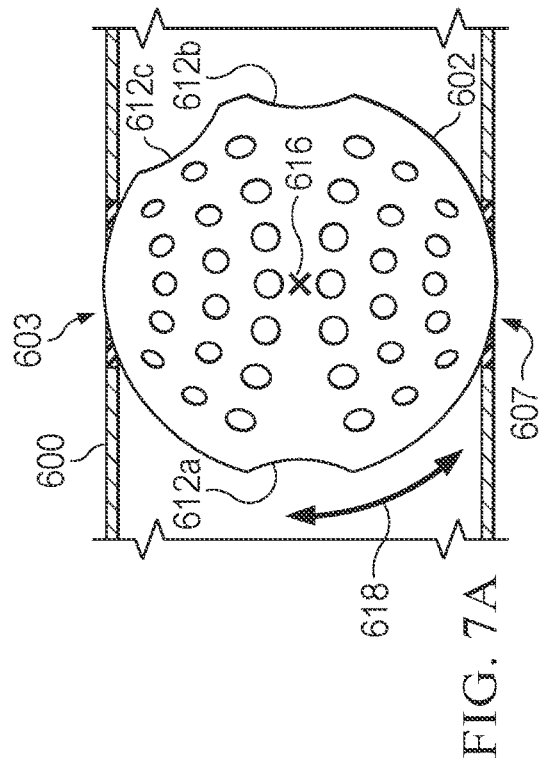

Referring now to FIG. 7B, the valve 602 is positioned such that port 612a is aligned with the vent 603 and port 612b is aligned with the drain 607. In this configuration, air escapes through the vent 603 as it is displaced by water entering the flotation pod 600 through the drain 607 (or grate/louvers in other embodiments hereinbelow, which are open due to their alignment with respective ports. FIG. 7B therefore corresponds to a flood, or submerge, condition of the flotation pod, in which the pod sinks further beneath the surface of the water.

Figure 7C:
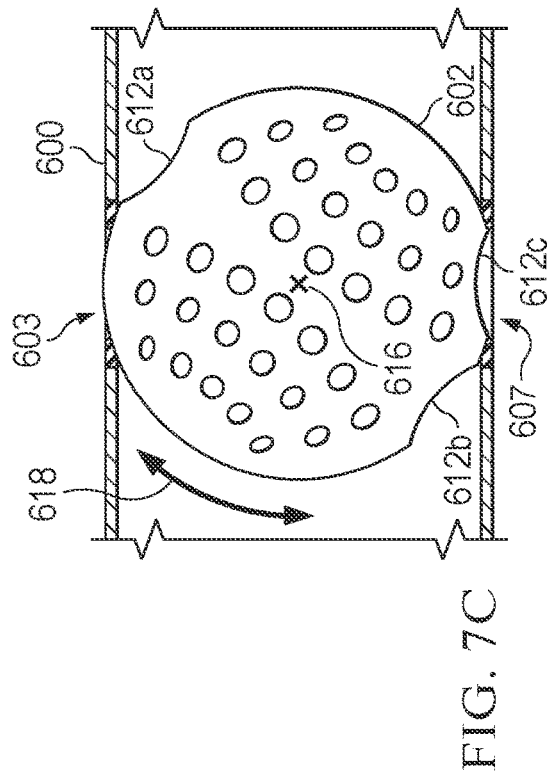

Referring now to FIG. 7C, the valve 602 is positioned such that port 612c is aligned with the drain 607 (i.e., the drain 607 is open) and none of the ports 612a-612c are aligned with the vent 603 (i.e., the vent 603 is closed). In this configuration, pressurization of the pod 600 causes water to be expelled via the drain 607 without being replaced by water entering through the vent 603 (which is sealed). FIG. 7C therefore corresponds to a resurface condition of the flotation pod, in which the pod rises to the surface of the water. FIG. 7D is a top perspective view of the valve 602.

Figure 8A:
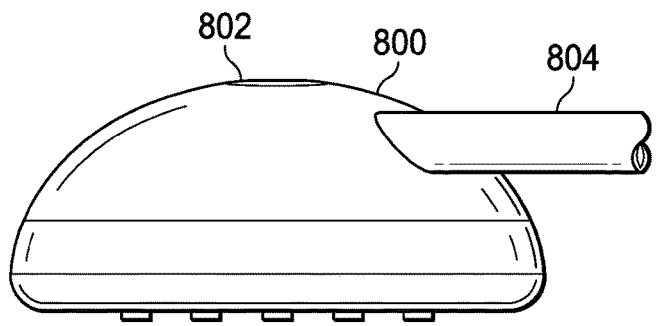
FIGS. 8A-8D illustrate various views of submersible pod portions of the submersion system of FIG. 3 in accordance with embodiments described herein.
Figure 8B:
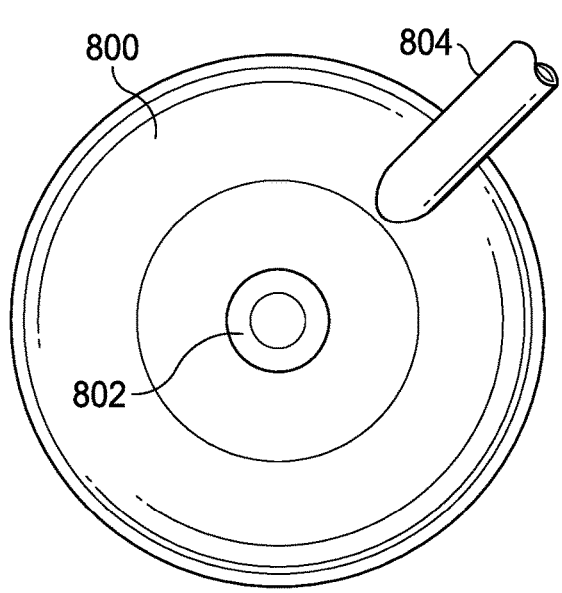
Figure 8C:
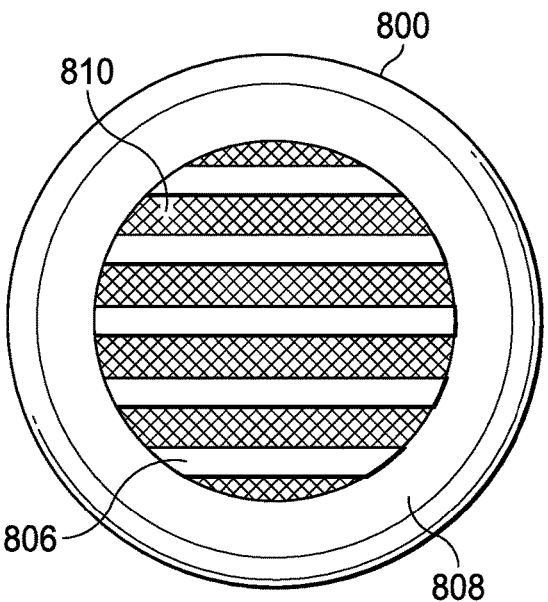
Figure 8D:
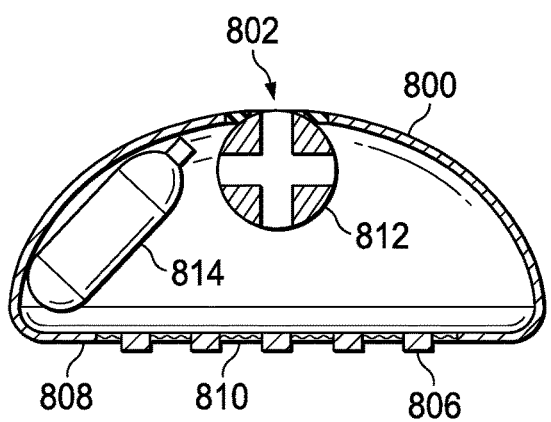

FIGS. 8A-8D illustrate various views of an example floatation pod 800, which may be used to implement one of more of flotation pods 322 (FIG. 3), 502 (FIG. 5). FIG. 8A is a perspective view of flotation pod 800 showing a vent 802 comprising an airtight seal surrounding the vent and a portion of an attachment mechanism 804 for attaching the flotation pod 800 to a submersible aerial drone (not shown in FIGS. 8A-8D). FIG. 8B top view of flotation pod 800. FIG. 8C is a bottom view of the flotation pod 800. In the embodiment illustrated in FIG. 8B, a grate 806 is disposed over an opening 808 in the bottom of the flotation pod 800. A mesh screen 810 may be provided for blocking debris from entering the flotation pod 800. The grate 806 may be open, flapped, or louvered. FIG. 8D is cutaway a side view of the flotation pod 800 showing the top vent 802 surrounded by an airtight seal, the grate 806, opening 808, and mesh screen 810, and a valve 812, which in the illustrated embodiment may be implemented as a multiport ball valve, as described in FIGS. 6 and 7A-7D, although other valve types may be used. In the illustrated embodiment, the flotation pod 800 includes an optional integral compressed gas cylinder 814, such that the flotation pod 800 is independently operable In one embodiment of a submersion system, a modular approach is deployed, in which each pod may include an independently operate compressed gas cylinder, flood system, and vent system. In another embodiment of a submersion system, a single compressed gas chamber is deployed, in which one master compressed gas chamber is ported to each flotation pod using individually controlled valves for ballast control. In yet another embodiment of a submersion system, a redundancy approach is deployed, in which a master compressed gas chamber is ported to each flotation pod and a smaller backup cylinder (with or without an inflatable bladder) is included in each flotation pod for emergency backup. In still another embodiment of a submersion system, a ballast control with multiple flotation pods approach is deployed, in which small pumps are used to transfer water between multiple flotation pods to accomplish ballast control.

Figure 9:
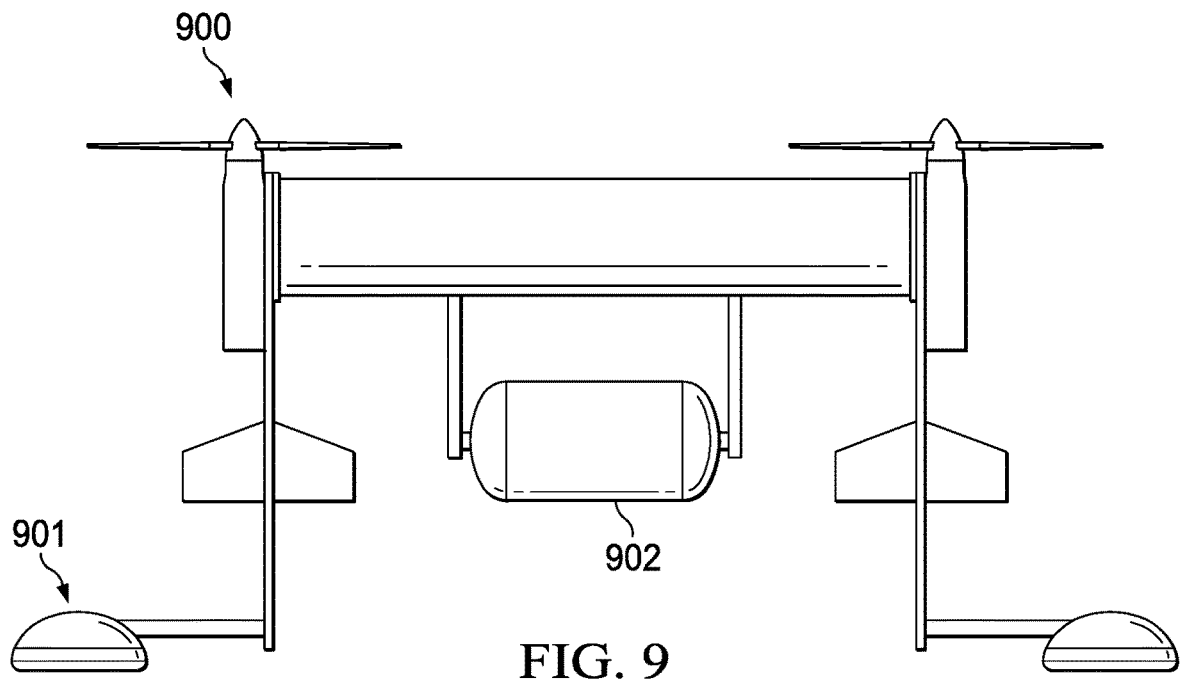
FIG. 9 illustrates an alternative embodiment of a waterproof aerial drone including a submersion system in accordance with embodiments described herein.

Referring to FIG. 9, in accordance with features of embodiments described herein, a waterproof aerial drone 900 including a submersion system 901, which is similar in all material respects to waterproof aerial drones with submersion systems shown and described hereinabove, may be used to implement a delivery and recovery system for a submersible drone or remotely operated vehicle (ROV) (which terms may be used interchangeably herein). As shown in FIG. 9, drone 900 includes a cargo pod 902 in which a submersible drone or ROV (not shown in FIG. 9) may be contained for transport by the drone 900.

Figure 10:
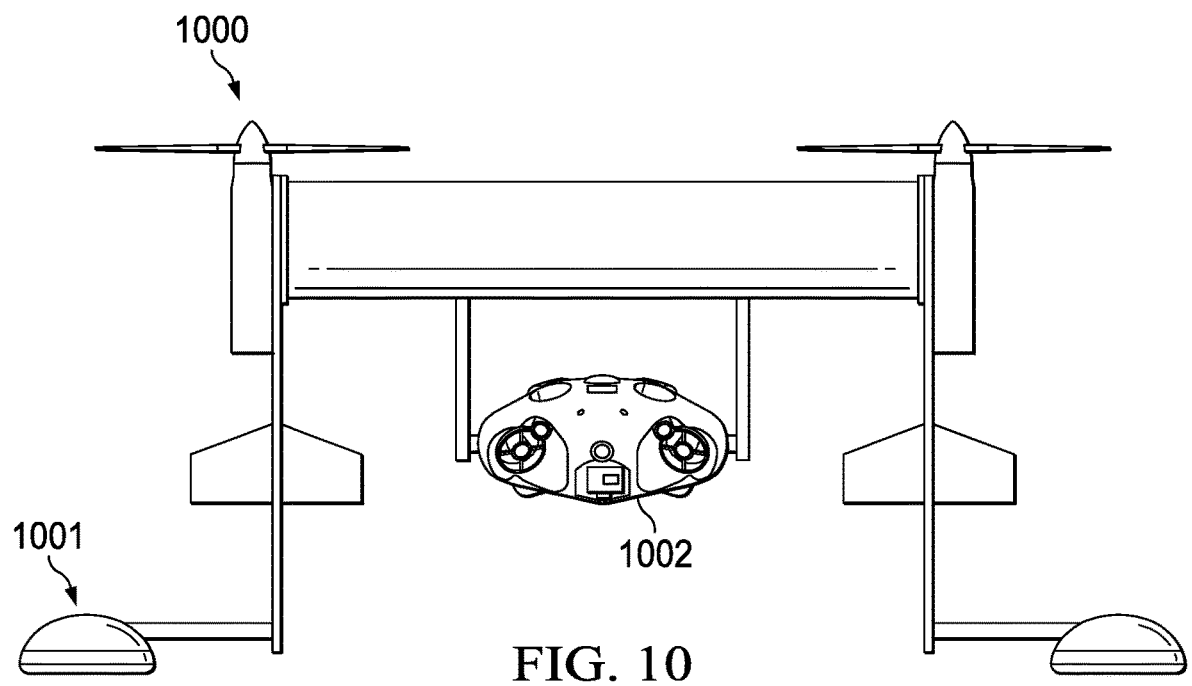
FIG. 10 illustrates an alternative embodiment of a waterproof aerial drone including a submersion system in accordance with embodiments described herein.

In an alternative embodiment, as shown in FIG. 10, a waterproof aerial drone 1000 including a submersion system 1001, which is similar in all material respects to waterproof aerial drones including submersion systems described and illustrated hereinabove, may be used to implement a delivery and recovery system for a submersible drone or remotely operated vehicle (ROV) 1002. Unlike the embodiment illustrated in FIG. 9, in the embodiment illustrated in FIG. 10, the submersible drone 1002 is not contained within a cargo pod but is suspended from appropriate structure of the aerial drone 1000.

Figure 11:
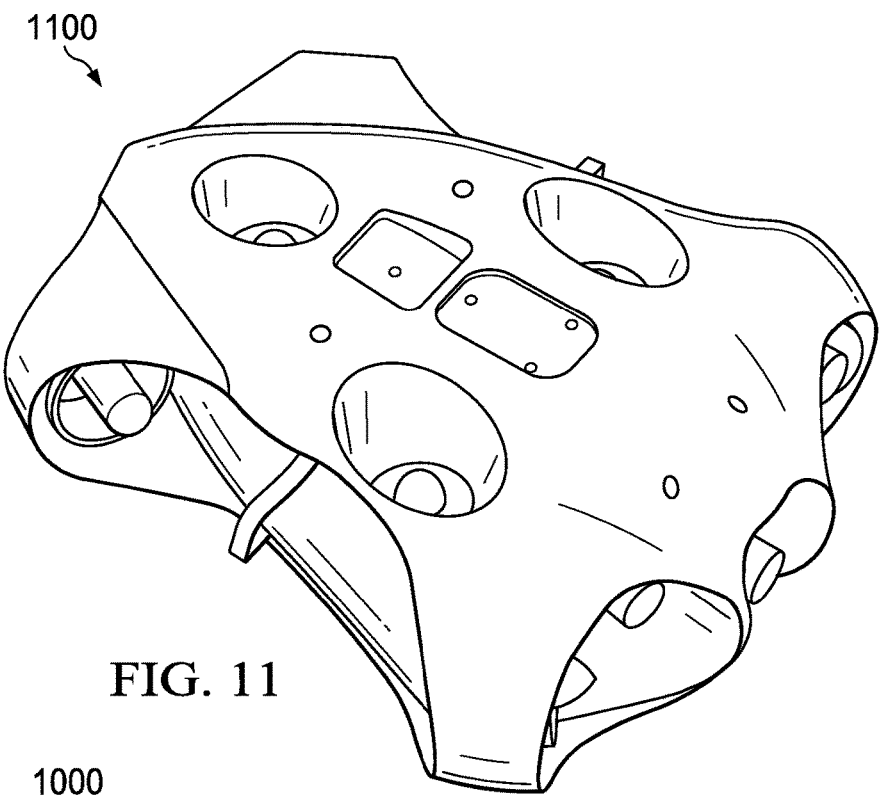
FIG. 11 illustrates a submersible drone for use in connection with a waterproof aerial drone in accordance with embodiments described herein.

FIG. 11 is a perspective view of an example submersible drone 1100 for use in connection with embodiments described herein. In particular, the drone 1100 may be transported, delivered, and recovered using any one of the waterproof aerial drones including a submersion system described and illustrated herein.

Figure 12:
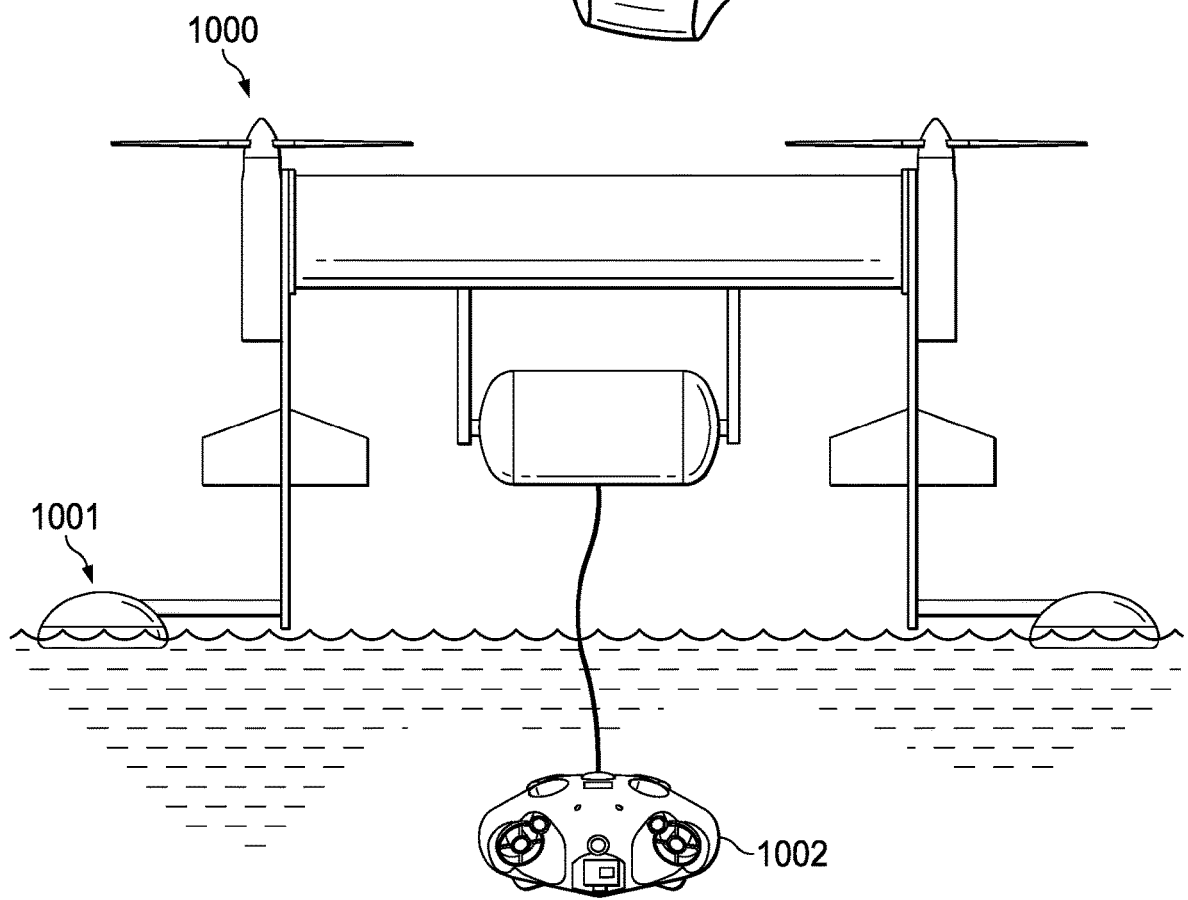
FIG. 12 illustrates operation of the waterproof aerial drone in connection with the submersible drone in accordance with embodiments described herein.

With reference again to FIG. 10 and as further illustrated in FIG. 12, in operation, upon arrival at a designated water location, submersion system 1001 (supporting waterproof aerial drone 1000) may float upon a surface of the water or may partially or fully submerge beneath the surface of the water as enabled by the submersion system thereof. Once the drone 1000/system 1001 is in an appropriate position, the drone 1002 may be launched on its mission. In accordance with features of embodiments described herein, the drone 1002 may be remotely operated or may operate autonomously.

In certain embodiments, as illustrated in FIG. 12, drone 1002 may tethered to drone 1000 and/or system 1001 for remote operation and power. Although as shown in FIG. 12, the drone 1000/system 1001 is shown as floating on a surface of the body of water while the drone 1002 executes its mission, it will be recognized that the drone/system may alternatively be partially or fully submerged beneath the surface of the water during that time.

Embodiments described herein for a waterproof aerial drone including a submersion system that may be used to deliver and recover a submersible drone has numerous uses and potential benefits. For example, such an arrangement enables extended delivery range and operational area for facilitating unmanned underwater exploration. Additionally, one or both of the waterproof aerial drone and the submersible drone may be autonomously deployed and recovered. Moreover, independent power sources may be provided for each drone, with the aerial drone conserving power for flight while the submersible drone performs its mission. In certain embodiments, the waterproof aerial drone may be configured to recharge a battery of the submersible drone. It will be recognized that the submersible drone may be delivered by a first aerial drone and recovered by a second aerial drone. Moreover, multiple aerial drones may be deployed in an area to provide recharging (or battery exchange) stations for one or more submersible drones in the area.

Other benefits include the fact that submerged or near-surface deployment of submersible drones (enabled by the waterproof aerial drones with submersion systems as described herein) decreases or eliminates potential impact damage that may be caused by drop deployment. Additionally, a fully or partially submerged aerial drone can deploy a traditional or floating antenna to serve as a signal relay station to extend the range and functionality of a submersible drone. Still further, the system enables covert deployment of the submersible drone and low risk of detection of the aerial drone while the submersible drone is "on station" (performing its mission), enhanced weather survivability, and enables each vehicle to operate in its own design specialized environment (i.e., the aerial drone provides long rage aerial deployment and low submersion depth and the submersible drone is capable of diving to deeper depths than the aerial drone). Finally, a waterproof aerial drone allows for the submersible drone to propel itself into a docking station and can be configured with a hoist type retrieval system for a floating aerial drone or emergency retrieval if the submersible drone loses power and is positively buoyant.

Example 1 is a submersion system for a rotorcraft, the submersion system including a control module for controlling a depth to which the rotorcraft is submerged in a body of water; a compressed air chamber associated with the control module; and at least one flotation pod having a sealable opening on a top surface thereof and an opening on a bottom surface thereof; wherein the control module selectively causes water to be taken into the at least one flotation pod to cause the submersion system to submerge in the body of water and selectively causes water to be evacuated from the at least one flotation pod to cause the submersion system to float in the body of water; and wherein the control module selectively causes pressurized air from the compressed air chamber to be injected into the at least one flotation pod.

In Example 2, the submersion system of Example 1 may further include the at least one flotation pod comprising an airtight body of the rotorcraft.

In Example 3, the submersion system of any of Examples 1-2 may further include the at least one flotation pod comprising an airtight vent valve on a top surface thereof and a flood/drain valve on a bottom surface thereof and the control module controlling opening and closing of the valves.

In Example 4, the submersion system of any of Examples 1-3 may further include the at least one flotation pod comprising an airtight vent valve on a top surface thereof and an opening in a bottom surface thereof and the control module controlling opening and closing of the valve.

In Example 5, the submersion system of any of Examples 1-4 may further include the opening in the bottom surface thereof being covered by a grate.

In Example 6, the submersion system of any of Examples 1-5 may further include the at least one flotation pod comprising a vent on a top surface thereof and a drain on a bottom surface thereof, the at least one flotation pod further comprising a three-way valve, and a position of the three-way valve controlling whether each of the vent and drain is open.

In Example 7, the submersion system of any of Examples 1-6 may further include the three-way valve comprising at least one of a hollow ball valve and a hollow cylinder valve.

In Example 8, the submersion system of any of Examples 1-7 may further include the compressed air chamber being integrated with the at least one submersion pod.

In Example 9, the submersion system of any of Examples 1-8 may further include the compressed air chamber being connected to the at least one submersion pod via a control valve the position of which is controlled by the control module.

In Example 10, the submersion system of any of Examples 1-9 may further include depth sensors for indicating a depth of the submersion system to the control module.

In Example 11, the submersion system of any of Examples 1-10 may further include the at least one submersion pod consisting of four submersion pods and wherein each one of the submersion pods is connected to a distal end of a tail boom of the rotorcraft.

Example 12 is an aerial delivery and recovery system including a tail sitter aircraft for transporting an unmanned submersible exploration device; a submersion system connected to the tail sitter aircraft, the submersion system comprising a control module for controlling a depth to which the tail sitter aircraft is submerged in a body of water; a compressed air chamber associated with the control module; and at least one flotation pod connected to the rotorcraft, the flotation pod having a sealable opening on a top surface thereof and an opening on a bottom surface thereof; wherein the control module selectively causes water to be taken into the at least one flotation pod to cause the submersion system to submerge in the body of water and selectively causes water to be evacuated from the at least one flotation pod to cause the submersion system to float in the body of water; and wherein the control module selectively causes pressurized air from the compressed air chamber to be injected into the at least one flotation pod.

In Example 13, the aerial delivery and recovery system of Example 12 may further include a delivery pod connected to the tail sitter aircraft in which the unmanned submersible exploration device is housed during the transporting and from which the unmanned submersible exploration device is launched after the aerial delivery recovery system is submerged to a particular depth in the body of water.

In Example 14, the aerial delivery and recovery system of any of Examples 12-13 may further include the delivery pod comprising a charging station for the unmanned submersible exploration device.

In Example 15, the aerial delivery and recovery system of any of Examples 12-14 may further include the unmanned submersible exploration device being tethered to the aerial delivery and recovery system during underwater exploration activities.

In Example 16, the aerial delivery and recovery system of any of Examples 12-15 may further include the unmanned submersible exploration device being capable of at one of remote control operation and autonomous operation.

In Example 17, the aerial delivery and recovery system of any of Examples 12-16 may further include the tail sitter aircraft being capable of at one of remote control operation and autonomous operation.

Example 18 is a method of operating an aerial delivery and recovery system (ADRS) comprising a waterproof unmanned aerial vehicle (UAV) for transporting an unmanned submersible exploration device a submersion system connected to the UAV for controlling a depth to which the UAV is submerged in a body of water, the method comprising landing the ADRS on a surface of the body of water; submerging the ADRS to a selected depth beneath the surface of the body of water; and subsequent to the submerging, launching the unmanned submersible exploration device from the UAV into the body of water.

In Example 19, the method of Example 18 may further include, subsequent to the launching, docking the unmanned submersible exploration device to the UAV; and returning the ADRS to the surface of the body of water.

In Example 20, the method of any of Examples 18-19 may further include, subsequent to the launching, docking the unmanned submersible exploration device to a UAV comprising a second ADRS; and returning the ADRS to the surface of the body of water.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A submersible rotorcraft, comprising:
a pair of wings;
tail booms attached to opposite outboard ends of the wings;
a control module for controlling a depth to which the rotorcraft is submerged in a body of water;
a compressed air chamber associated with the control module; and
flotation pods attached to ends of each of the tail booms distal to ends of the tail booms attached to the wings, each of the flotation pods including a sealable opening on a top surface thereof and an opening on a bottom surface thereof;
wherein the control module selectively causes water to be taken into the flotation pods to cause the submersion system to submerge in the body of water and selectively causes water to be evacuated from the flotation pods to cause the rotorcraft to float in the body of water such that the wings are supported by the tail booms above a surface of the body of water; and
wherein the control module selectively causes pressurized air from the compressed air chamber to be injected into the flotation pods.

2. The submersion system of claim 1, wherein the flotation pods comprises an airtight vent valve on a top surface thereof and a flood/drain valve on a bottom surface thereof and wherein the control module controls opening and closing of the valves.

3. The submersion system of claim 1, wherein the flotation pods comprises a vent on a top surface thereof and a drain on a bottom surface thereof, the at least one flotation pod further comprising a three-way valve, and wherein a position of the three-way valve controls whether each of the vent and drain is open.

4. The submersion system of claim 3, wherein the three-way valve comprises at least one of a hollow ball valve and a hollow cylinder valve.

5. The submersion system of claim 1, wherein the compressed air chamber is integrated with the floatation pods.

6. The submersion system of claim 1, wherein the compressed air chamber is connected to the floatation pods via a control valve having a position that is controlled by the control module.

7. The submersion system of claim 1 further comprising depth sensors for indicating a depth of the submersion system to the control module.

8. A system comprising:
a tail sitter aircraft, comprising:
a pair of wings; and
tail booms attached to opposite outboard ends of the wings;

a submersion system connected to the tail sitter aircraft, the submersion system comprising:
- a control module for controlling a depth to which the tail sitter aircraft is submerged in a body of water;
- a compressed air chamber associated with the control module; and
- flotation pods attached to ends of each of the tail booms distal to ends of the tail booms attached to the wings, each of the flotation pods including a sealable opening on a top surface thereof and an opening on a bottom surface thereof; and an unmanned submersible exploration device, wherein the tail sitter aircraft is configured to provide aerial transportation for the unmanned submersible exploration device;

wherein the control module selectively causes water to be taken into the flotation pods to cause at least a portion of the tail sitter aircraft to submerge in the body of water and selectively causes water to be evacuated from the flotation pods to cause the tail sitter aircraft to float in the body of water such that the wings are supported above a surface of the body of water by the tail booms; and wherein the control module selectively causes pressurized air from the compressed air chamber to be injected into the flotation pods.

9. The system of claim 8 further comprising a delivery pod connected to the tail sitter aircraft in which the unmanned submersible exploration device is housed during the transporting and from which the unmanned submersible exploration device is launched after the tail sitter aircraft is submerged to a particular depth in the body of water.

10. The system of claim 8, wherein the unmanned submersible exploration device is tethered to the tail sitter aircraft during underwater exploration activities.

11. The system of claim 8, wherein the unmanned submersible exploration device is capable of at least one of remote control operation and autonomous operation.

12. The system of claim 8, wherein the tail sitter aircraft is capable of at least one of remote control operation and autonomous operation.

\* \* \* \* \*